United States Patent
Patterson et al.

(10) Patent No.: US 6,639,209 B1
(45) Date of Patent: Oct. 28, 2003

(54) METHOD OF AUTOMATIC STANDARDIZED CALIBRATION FOR INFRARED SENSING DEVICE

(75) Inventors: Wade C. Patterson, Huntsville, AL (US); Thomas J. Watson, Madison, AL (US)

(73) Assignee: Synpase, Inc., Huntsville, AL (US)

( * ) Notice: Subject to any disclaimer, the term of this patent is extended or adjusted under 35 U.S.C. 154(b) by 177 days.

(21) Appl. No.: 10/045,302

(22) Filed: Oct. 23, 2001

Related U.S. Application Data

(60) Provisional application No. 60/267,441, filed on Feb. 8, 2001, and provisional application No. 60/242,898, filed on Oct. 24, 2000.

(51) Int. Cl.[7] ............................ G05B 23/02; E03D 5/10; E03C 1/05
(52) U.S. Cl. ................. 250/252.1; 250/221; 250/341.5; 4/623; 251/129.01
(58) Field of Search ........................... 250/252.1, 341.5, 250/221; 4/623; 251/129.01

(56) References Cited

U.S. PATENT DOCUMENTS

| | | | |
|---|---|---|---|
| 390,960 A | 10/1888 | Gustin | |
| 1,940,090 A | 12/1933 | Hetherington | |
| 2,539,598 A | 1/1951 | Suska | |
| 4,145,769 A | 3/1979 | MacFarlane et al. | |
| 4,420,811 A | 12/1983 | Tarnay et al. ................ | 364/510 |
| 4,563,780 A | 1/1986 | Pollack | |
| 4,682,728 A | 7/1987 | Oudenhoven et al. | |
| 4,700,884 A | 10/1987 | Barrett et al. | |
| 4,854,499 A | 8/1989 | Neuman | |
| 4,923,116 A | 5/1990 | Homan | |
| 4,965,448 A | 10/1990 | Morse et al. ............. | 250/252.1 |
| 4,974,636 A | 12/1990 | Cogger | |
| 5,062,453 A | 11/1991 | Saadi et al. | |
| 5,170,514 A | 12/1992 | Weigert | |
| 5,217,035 A | 6/1993 | Van Marcke | |
| 5,243,717 A | 9/1993 | Yasuo | |
| 5,281,808 A | * 1/1994 | Kunkel ........................ | 250/221 |
| 5,328,597 A | 7/1994 | Boldt, Jr. et al. | |
| RE35,018 E | 8/1995 | Homan | |
| 5,566,702 A | 10/1996 | Philipp | |
| 5,570,869 A | 11/1996 | Diaz et al. ............. | 251/129.04 |
| 5,577,706 A | 11/1996 | King | |
| 5,655,561 A | 8/1997 | Wendell et al. | |
| 5,745,049 A | 4/1998 | Akiyama et al. ...... | 340/870.17 |
| 5,819,336 A | 10/1998 | Gilliam et al. .................. | 4/623 |
| 5,910,776 A | 6/1999 | Black | |
| 5,915,417 A | 6/1999 | Diaz et al. | |
| 5,984,262 A | * 11/1999 | Parsons et al. ........ | 251/129.04 |
| 6,000,429 A | 12/1999 | Van Marcke | |
| 6,006,784 A | 12/1999 | Tsutsui et al. | |
| 6,038,519 A | 3/2000 | Gauthier et al. | |
| 6,059,192 A | 5/2000 | Zosimadis | |
| 6,123,093 A | 9/2000 | D'Antonio et al. | |
| 6,124,806 A | 9/2000 | Cunningham et al. | |
| 6,273,394 B1 | * 8/2001 | Vincent et al. ........ | 251/129.04 |
| 2002/0088823 A1 | 7/2002 | Tabacchi et al. .............. | 222/52 |

FOREIGN PATENT DOCUMENTS

| | | |
|---|---|---|
| EP | 0 332 045 A2 | 9/1989 |
| EP | 1 164 450 A1 | 12/2001 |
| JP | 62-256112 | 11/1987 |
| JP | 62-269212 | 11/1987 |

* cited by examiner

*Primary Examiner*—Albert Gagliardi
(74) *Attorney, Agent, or Firm*—Thomas, Kayden, Horstemeyer & Risley, L.L.P.

(57) ABSTRACT

A method for calibrating automatic infrared sensing devices having control modules, an IR detector, and an IR emitter by using a select infrared emitter/detector pair to calibrate a plurality of control modules wherein an appropriate infrared emitter input value to the select infrared emitter is obtained to provide a given output from the select infrared detector in response to infrared radiation reflected from a known test object, and the appropriate infrared emitter input value is then determined and stored permanently in one or more control modules as a calibration standard.

27 Claims, 3 Drawing Sheets

METHOD OF AUTOMATIC STANDARDIZED CALIBRATION FOR INFRARED SENSING DEVICE

This application claims the benefit of an earlier filed provisional patent application titled "REMOTELY MANAGED AUTOMATIC DISPENSING APPARATUS AND METHOD," application Ser. No. 60/242,898, filed Oct. 24, 2000, the disclosure of which is hereby incorporated by reference.

BACKGROUND OF INVENTION

1. Field of Invention

The present invention relates generally to the field of infrared detecting devices and more particularly to the automatic standardized calibration of infrared detection devices.

2. Technical Background

Various methods have been employed to electronically control water flow through a water control device such as a faucet or spigot. Among the accepted and conventional methods is the use of an optical sensor for detecting reflections from an infrared ("IR") source or IR emitter. When processing electronics determine the reflection has exceeded a threshold value, a control signal opens a solenoid valve. Generally speaking, a pulsed IR beam is reflected from an object (such as a user's hands) and sensed to determine whether to activate or deactivate a solenoid valve to control water flow from the water control device. Pulsed IR sensing remains at the forefront of sensing techniques used with these types of devices due in part to its reasonable performance and low cost.

Because of variations in processing circuits, emitter characteristics and sensor characteristics, it is necessary to calibrate the IR system. Calibration of infrared sensing devices such as, for example, automatically activated flow control devices is labor intensive and inefficient with respect to devices presently on the market. The lost cost IR sensing devices employed in automatically activated flow control devices vary with respect to power requirements, performance, and other criteria. As a result, readings taken by these IR sensing units (such as whether a user's hands are present beneath the aerator of a faucet) are generally non-uniform from device to device, and therefore often result in improper activation and deactivation of some devices. Similarly, as battery power for these devices decreases over time, so does the power output of the IR sensing devices. Moreover, water droplets sprayed or otherwise deposited on or near the IR detector lens or lens cover have been known to cause such devices to malfunction. As a result, manual calibration of conventional infrared sensing systems of automatically activated flow control devices is generally required during initial installation, and thereafter on a frequent basis following extended periods of use.

Most infrared sensing units have an IR emitter and IR detector embedded in an electronics board in the collar of a faucet. During manufacturing, each emitter and detector has to be screened, requiring technicians to manually adjust settings when they go through calibration steps. A technician is required to make measurements and adjustments to the main electronics board which is time consuming and costly.

SUMMARY OF INVENTION

The present invention provides a method for calibrating infrared detecting devices which detect the presence of an object by detecting an IR reflection. The output of the IR detector is calibrated by a control module which receives the output of the IR detector and regulates the output of the IR emitter. A single standard pair of an IR detector and an IR emitter is sufficient to calibrate an unlimited number of control modules. The method eliminates the need to manually calibrate and adjust each IR detector and IR emitter that is part of the infrared detecting device. The method uses a standard IR detector and IR emitter with output characteristics in the middle of a suitable operating range. The control module activates the IR emitter with an input value to emit IR radiation which is reflected from a standard object at a standard distance from the IR emitter to an IR detector which is also a standard distance from the object. The output from the IR detector is transmitted to a control module. If the IR detector output is out of the desired range, a calibration manager directs the signal processor to increase or decrease the output of the IR emitter. This process is repeated until the output of the IR detector is within midrange. The value of the corresponding input to the IR emitter to achieve this midrange output value of the IR detector is stored in the nonvolatile memory of the control module and the calibration manager reprograms itself to use this calibration value of input to the IR emitter as a reference standard.

DETAILED DESCRIPTION OF THE PREFERRED EMBODIMENTS

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
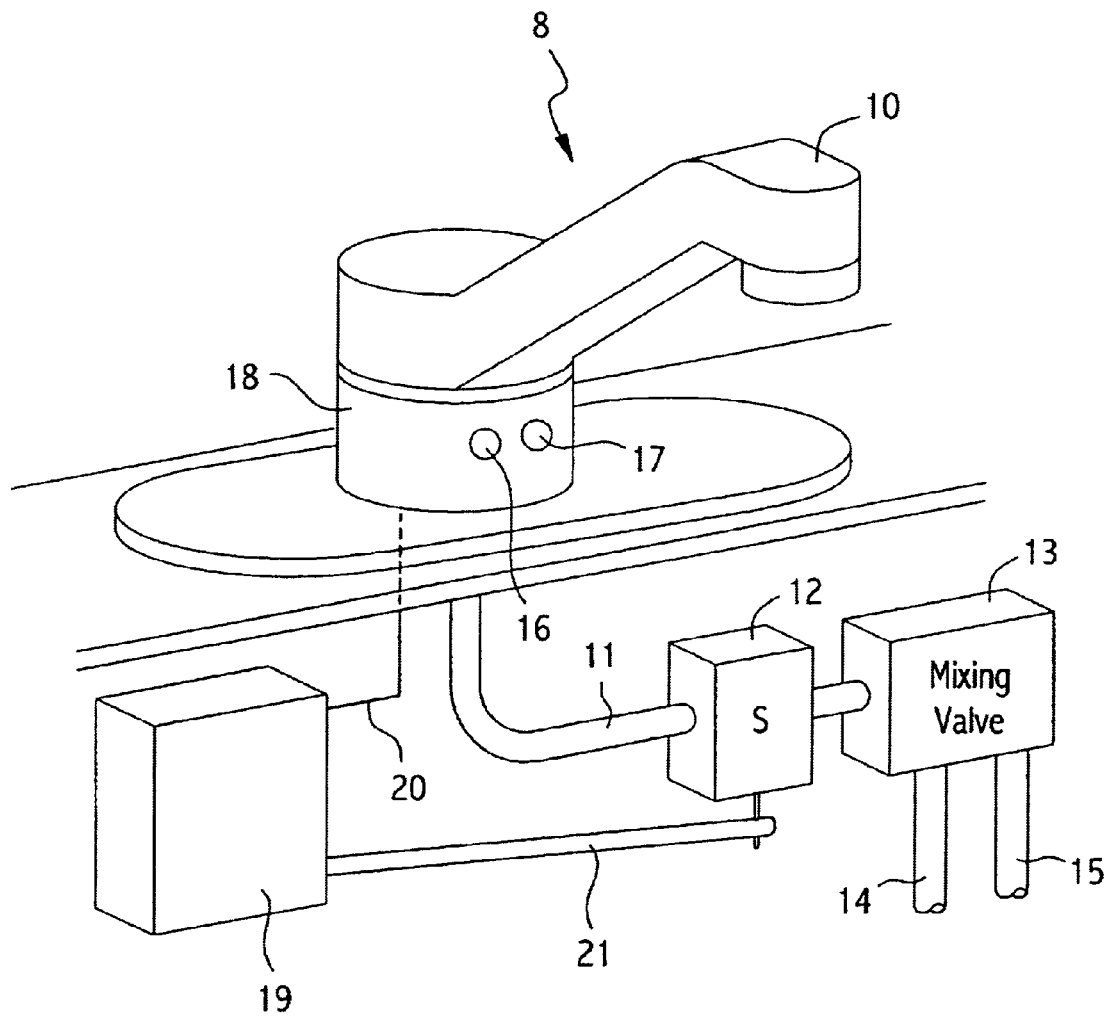
FIG. 1 is an exemplary embodiment of a fluid dispensing system in accordance with the present invention.
Figure 2:
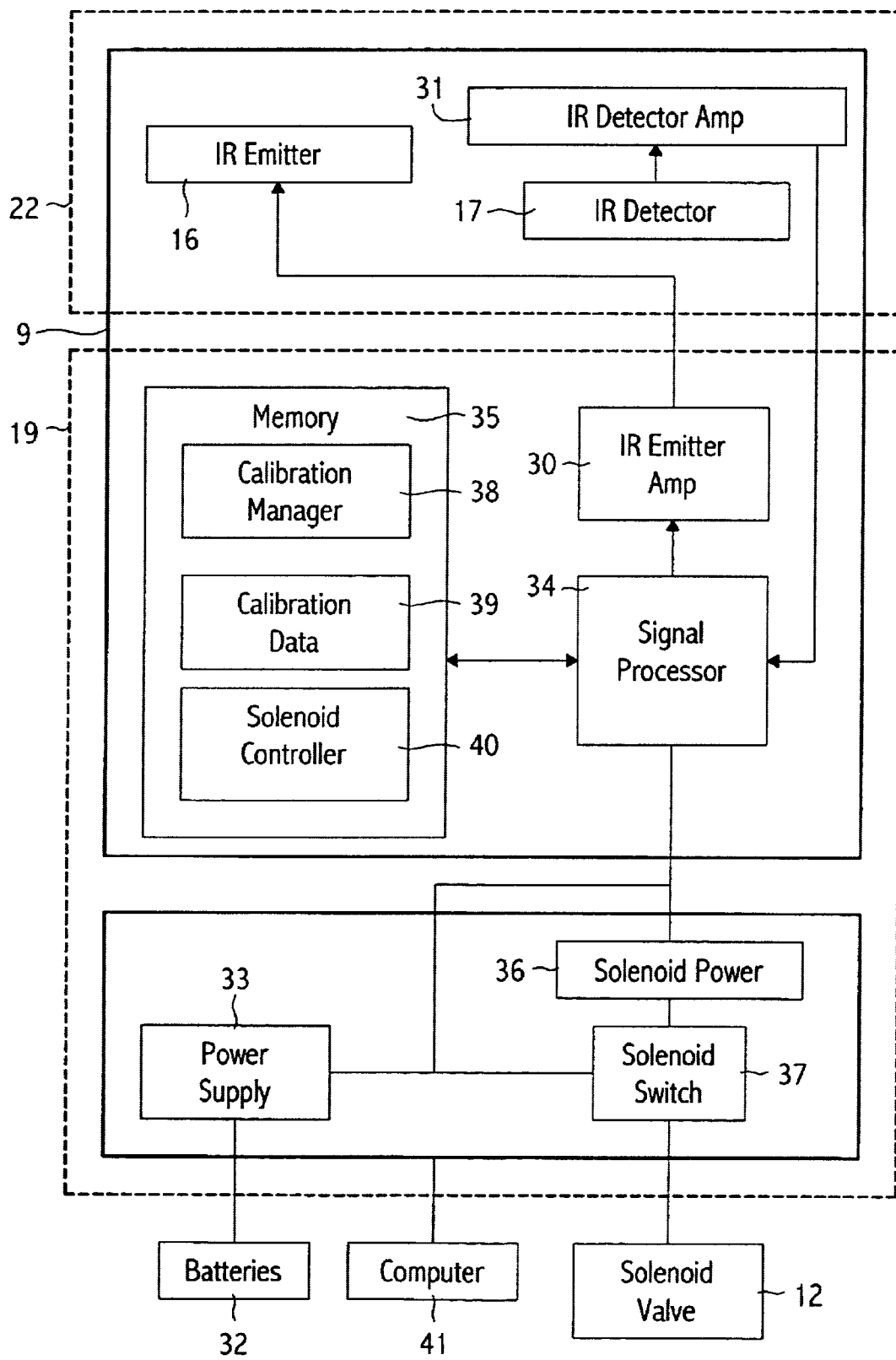
FIG. 2 is a block diagram illustrating the fluid dispensing system depicted in FIG. 1.

FIGS. 1 and 2 show a fluid dispensing system that employs an infrared detection system 9 in accordance with the present invention. As shown in FIG. 1, the fluid dispensing system 8 includes an automated faucet 10. Automated faucet 10 has plumbing 11 in line with a solenoid valve 12 and a mixing valve 13, which is connected to a hot water source 14 and a cold water source 15. Faucet 10 also has IR emitter 16 and IR detector 17 on a sensor board in a collar 18 around faucet 10. The sensor board is preferably connected electrically to control module 19 by connector 20. The connector 20 provides IR emitter 16 and IR detector 17 interface to module 19. Control module 19 output is also connected electrically to solenoid 12 by connector 21.

In the example shown by FIG. 1 the calibration manager 38 (see FIG. 2) in control module 19 controls the intensity and duration of each pulse emitted from IR emitter 16. When a user places his or her hands near faucet 10, the emitted IR radiation is reflected from the hands to IR detector 17. IR detector 17 sends an output to calibration manager 38 which may then signal solenoid controller 40 (see FIG. 2) to open solenoid valve 12 so that water will flow out of faucet 10. When the user removes his or her hands from faucet 10, the absence of sufficiently detected IR radiation signals control module 19 to close or deactivate solenoid 12.

To insure proper operation it is desirable to calibrate the IR emitter 16, IR detector 17, associated circuitry amplifiers 30 and 31, and signal processor 34. This may be performed during manufacturing and heretofore has required manual calibration. In accordance with the present invention, calibration can now be performed automatically by the calibration manager 38 using electronic or software methodology or a combination thereof.

FIG. 2 shows the components of an infrared detecting device used in the calibration procedure for the present invention. Sensor board 22 in collar 18 has IR emitter 16 and IR detector 17 which are connected to IR emitter amp 30 and IR detector amp 31, respectively. Control module 19 has a power supply 33 which provides power to a signal processor 34, a programmable memory 35 with computing capability, a solenoid power source 36, and a solenoid switch 37. Memory 35 also has a calibration manager 38, calibration data 39, and solenoid controller 40. The solenoid switch 37 under the control of solenoid controller 40, can open solenoid valve 12. There are at least two programs in memory 35, one in solenoid controller 40 for turning the faucet 10 on and off, and the other in calibration manager 38 for calibrating the outputs of IR emitter 16 and IR detector 17 during manufacture and during commercial use. If desired, control module 19 may communicate with a remote computer 39 so that computer 39 can remotely monitor the memory 35 for computing capability and calibration values obtained during a calibration procedure. Computer 39 typically is adapted to use any of the known operating systems and comprises a processor, random access memory, read only memory, disk drives, display, communications applications, and the like. The value of outputs produced by the IR detector and IR emitter will have optimal or standard ranges in which the infrared detecting device can operate satisfactorily. These predetermined maximum and minimum output ranges and the midpoint of these output ranges can be entered into calibration data 39 in memory 35. The infrared detection and calibration system 9 includes sensor board 22, memory 35, and signal processor 34.

Calibration manager 38 is configured to direct signal processor 34 to send an appropriate input signal to IR emitter amp 30 to cause IR emitter 16 to emit a given amount of infrared radiation. This radiation is detected by IR detector 17 and an input signal is thereby sent to IR detector amp 31 which then sends an amplified output signal to signal processor 34. Signal processor 34 then transmits this output signal to calibration manager 38. Calibration manager 38 is further configured to evaluate this output signal based on a standard range of values contained in calibration data 39 and thereby execute appropriate commands to signal processor 34 regarding input signals to IR emitter 16 to emit infrared radiation, or to solenoid controller 40 to direct signal processor to open or close solenoid valve 12.

Figure 3:
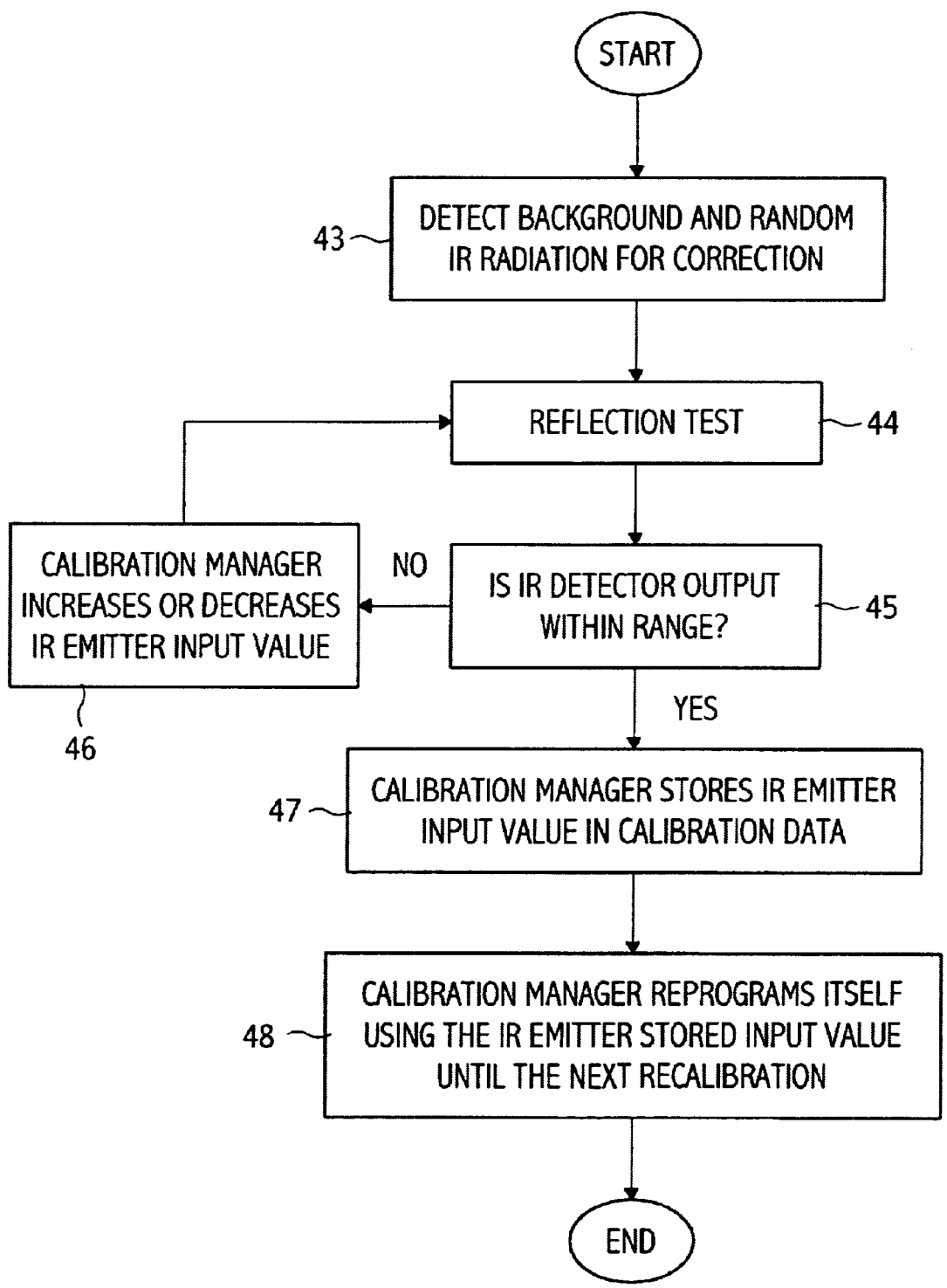
FIG. 3 is a flow chart illustrating the architecture and functionality of an infrared detection system depicted in FIGS. 1 and 2.

FIG. 3 shows a method of the present invention for calibrating the IR emitter 16 and IR detector 17 with connected circuitry in control module 19 during manufacture or during commercial use. The present methodology employed in the IR detection system 9 requires the use of a selected pair consisting of a single IR emitter and a single IR detector which serves as a standard for calibrations of multiple control modules. This selected pair may be thought of as a golden standard. In the example of the automatic faucet, it may be considered a standard or "golden" collar 18, as shown in FIG. 1. The standard collar is connected to a control module 19 to conduct a calibration reflection test. Typically, in this test, a white card is placed a given distance from the IR emitter 16, simulating the hands of a user, for example.

Prior to activation of IR emitter 16 by control module 19, IR detector 16 will detect background IR radiation. In addition, when IR emitter 16 is activated by control module 19, control module 19 provides an input signal to IR emitter 16 whereby IR emitter 16 produces an infrared signal or pulse (IR radiation) having an amplitude based on this input signal. In the absence of the IR emitter energy, some IR radiation may reflect back from other surrounding surfaces. This background and randomly reflected IR radiation (sometimes referred to as "ambient infrared radiation") is detected, measured, and can be used to make a correction for reflected IR radiation from the white card (or user's hands), by calibration manager 38 in memory 35 of control module 19 (step 43). The reflection test is then initiated by calibration manager 38 in memory 35 of control module 19. Calibration manager 38 directs signal processor 34 to activate IR emitter 16 to emit a known amount of IR radiation, which is reflected from the white card to the IR detector 17. IR detector 17 thereby sends an output signal to the signal processor 34, the strength or amplitude of the output signal being proportional to the strength of the detected infrared radiation (step 44).

The signal processor 34 sends the IR detector output signal to control manager 38 in memory 35 of control module 19 which determines whether the output signal is within the predetermied range or near the approximate midpoint within the predetermined range of standard values contained in calibration data 39 (step 45). If not, control module 19, through signal processor 34, increases or decreases the output of the IR emitter by increasing or decreasing the output of IR emitter amp 30 a desired increment (step 46) by sending an appropriate input signal to said IR emitter amp 30 and, hence, to IR emitter 16. The reflection test is then repeated until the IR detector output is within the predetermined range, preferably near the midrange (steps 44, 45, 46). Correction can be made to the detector output value, if desired, by subtracting randomly reflected IR generated output from the detector output generated by reflection from the white card.

If the IR detector output is within the predetermined range or at or near the midrange, the value of the IR emitter input that generated the satisfactory IR detector output is measured by said signal processor 34 and is sent from said signal processor 34 to calibration data 39 where the input value is stored permanently in nonvolatile memory (step 47). Calibration manager 38 is configured to then reprogram itself and thereafter to generate an emitter input signal based on the stored value until the next recalibration (step 48).

With the standardized calibration method of the present invention a single golden collar comprising one emitter/detector pair can be used to calibrate an unlimited number of control modules 19. The calibration occurs in the calibration manager 38 in memory 35 of control module 19, electronically or with software, or a combination thereof. This method, accordingly, facilitates the manufacture and maintenance of infrared detection devices by avoiding the need to manually calibrate the IR detector and/or the IR emitter that are manufactured with each control module 19.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, inputs to IR emitter 16 or outputs from IR detector 17 may be measured in current or voltage. Various types of IR emitters and/or detectors may be employed to implement the IR emitter 16 and/or the IR detector 17 of the present invention. Sensor board 22 may have other structural features contained therein, such as a microprocessor or an IRDA photodiode for diagnostic and maintenance functions, or a power supply and power source. IR emitter amp 30 is contained in control module 19, but could be contained in sensor board 22. Control module 19 may have any suitable type of microprocessor or computer to perform programming, software implementation, and data storage and memory. The control module may use an AC source of power instead of batteries. The white card may be replaced by any desired object for reflecting emitted infrared radiation.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A method for calibrating an infrared sensing devices, comprising:
    a) storing a predetermined infrared detector output range in a control module;
    b) emitting and detecting infrared radiation with a select infrared emitter/detector pair;
    c) comparing the output value of said select infrared detector to said predetermined output range; and
    d) calibrating multiple control modules by determining and storing an infrared emitter input value that produces an output value within said predetermined output range, using the same select infrared emitter/detector pair for the multiple control modules.

2. The method according to claim 1 further comprising said computer storing said infrared emitter input value in said control module memory.

3. The method according to claim 2 further comprising said control modules reprogramming itself to use said infrared emitter input value as a calibration standard for infrared detector output.

4. The method according to claim 3 wherein said control module has a signal processor to measure said output of said infrared detector, to increase or decrease infrared radiation output of said infrared emitter, to measure said infrared emitter input value, and to send said emitter input value to a software database in said control module.

5. The method according to claim 3 wherein said output of said infrared detector is electric current or electric voltage, or a combination thereof.

6. The method according to claim 3 wherein said control module increases or decreases output of said infrared emitter by altering electric current or voltage or a combination thereof of an input signal to said infrared emitter.

7. The method according to claim 3 wherein said select infrared emitter/detector pair comprises photodiodes.

8. The method according to claim 3 wherein said select infrared emitter/detector pair is contained within a collar for calibration of an infrared automatic sensing flow system.

9. A method for calibrating infrared sensing devices, comprising:
    a) measuring a first output of a single infrared detector in response to background and randomly reflected emitted infrared radiation;
    b) measuring a second output of said single infrared detector in response to emitted infrared radiation from a single infrared emitter and reflected from a test object;
    c) subtracting said first output from said second output and storing the resulting net output of said infrared detector in one or more control modules;
    d) comparing said net output of said infrared detector to a predetermined range of infrared detector output values in one or more control modules; and
    e) increasing or decreasing infrared emitter input value in one or more control modules to provide an infrared emitter radiation output so that said net output of said infrared detector is within said predetermined infrared detector output range.

10. The method according to claim 9 further comprising storing said infrared emitter input value in said control module memory.

11. The method according to claim 10 further comprising said control module reprogramming itself to use said infrared emitter input value as a calibration standard for infrared detector output.

12. The method according to claim 11 wherein said control module has a signal processor to measure said output of said infrared detector, to increase or decrease infrared radiation output of said infrared emitter, to measure said infrared emitter input value, and to send said emitter input value to a software database in said control module.

13. A method according to claim 11 wherein said output of said infrared detector is electric current or electric voltage, or a combination thereof.

14. A method according to claim 11 wherein said control module increases or decreases output of said infrared emitter by altering electric current or voltage or a combination thereof of an input signal to said infrared emitter.

15. A method according to claim 11 wherein said infrared emitter and said infrared detector are photodiodes.

16. A method according to claim 11 wherein said infrared emitter and said infrared detector are contained within a collar for calibration of an infrared automatic sensing flow system.

17. A method according to claim 11 wherein said infrared emitter and said infrared detector can be used to calibrate a plurality of control modules.

18. A system for calibrating infrared sensing devices, comprising:
    a) a single infrared emitter and a single infrared detector;
    b) one or more programable control modules with memory and a calibration manager;
    c) said control module having calibration data including a standard predetermined infrared detector output range of values; and
    d) said calibration manager configured to provide an infrared emitter input value for said infrared emitter to produce an infrared emitter radiation output so that output from said infrared detector receiving said infrared radiation reflected from an object is within said predetermined infrared detector output range in one or more control modules.

19. The system according to claim 18 wherein said control module is configured to further store said infrared emitter input value in said control module memory.

20. The system according to claim 19 further comprising said control module reprogramnming itself to use said infrared emitter input value as a calibration standard for infrared detector output.

21. The system according to claim 20 wherein said control module has a signal processor to measure said output of said infrared detector, to increase or decrease infrared radiation output of said infrared emitter, to measure said infrared emitter input value, and to send said emitter input value to calibration data in said control module.

22. The system according to claim 20 wherein said infrared emitter and said infrared detector are contained within a collar for calibration of an infrared automatic sensing flow system.

23. The system according to claim 20 wherein said single infrared emitter and said single infrared detector are configured to calibrate a plurality of control modules.

24. The system according to claim 20 wherein infrared detector output in response to background and randomly reflected emitted infrared radiation is subtracted from infrared detector output in response to emitted infrared radiation reflected from a test object to obtain a net infrared detector output.

25. The system according to claim 24 wherein said control module provides an infrared emitter input value to produce a net infrared detector output equal to said predetermined infrared detector output range in said control module.

26. The system according to claim 20 wherein infrared detector output in response to background and randomly reflected emitted infrared radiation is subtracted from infrared detector output in response to emitted infrared radiation reflected from a test object to obtain a net infrared detector output.

27. The system according to claim 26 wherein said control module provides an infrared emitter input value to produce a net infrared detector output equal to said predetermined infrared detector output range in said control module.

* * * * *